United States Patent
Chen et al.

(10) Patent No.: US 10,412,813 B1
(45) Date of Patent: Sep. 10, 2019

(54) AMBIENT LIGHT SENSOR

(71) Applicant: ANPEC ELECTRONICS CORPORATION, Hsinchu (TW)

(72) Inventors: Chih-Ning Chen, Taipei (TW); Chih-Heng Su, Hsinchu (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 16/273,708

(22) Filed: Feb. 12, 2019

(30) Foreign Application Priority Data

Oct. 17, 2018 (TW) ............................. 107136536 A

(51) Int. Cl.
*H05B 37/02* (2006.01)
*H05B 33/08* (2006.01)

(52) U.S. Cl.
CPC ..... *H05B 37/0218* (2013.01); *H05B 33/0818* (2013.01); *H05B 33/0851* (2013.01); *H05B 37/0227* (2013.01); *H05B 37/0272* (2013.01)

(58) Field of Classification Search
CPC ............ H05B 37/0227; H05B 37/0272; H05B 33/0845; H05B 33/0848; H05B 33/0866; H05B 33/0872; G01J 1/4204; G01J 1/44; G01J 1/46; H03M 1/38
USPC ............... 315/291, 297; 250/214 R, 39, 206; 356/72, 213, 228
See application file for complete search history.

(56) References Cited

U.S. PATENT DOCUMENTS

| | | | | |
|---|---|---|---|---|
| 9,000,345 | B2* | 4/2015 | Liu | G01J 1/46 250/214 AL |
| 9,739,659 | B2* | 8/2017 | Xu | G01J 1/44 |
| 2017/0084251 | A1* | 3/2017 | Zheng | G09G 5/10 |
| 2018/0324915 | A1* | 11/2018 | Luccato | H02M 3/33523 |

* cited by examiner

*Primary Examiner* — Tung X Le
(74) *Attorney, Agent, or Firm* — Li & Cai Intellectual Property (USA) Office

(57) ABSTRACT

An ambient light sensor is provided, which includes a photoelectric component, a variable capacitor, an operational amplifier, a comparator, a pulse generator circuit and a pulse accumulator circuit. The photoelectric component converts light energy into a photocurrent. The variable capacitor is connected between a first input terminal and an output terminal of the operational amplifier. A capacitance of the variable capacitor is adjusted according to the photocurrent. The operational amplifier outputs an amplified error signal based on a difference between an input voltage at its first input terminal and a reference voltage at its second input terminal. The comparator compares the amplified error signal with the reference voltage to output a comparison signal. The pulse generator circuit outputs a pulse signal based on the comparison signal. The accumulator circuit accumulates the number of counts that the input voltage is increased to a voltage larger than the reference voltage.

10 Claims, 8 Drawing Sheets

AMBIENT LIGHT SENSOR

CROSS-REFERENCE TO RELATED PATENT APPLICATION

This application claims the benefit of priority to Taiwan Patent Application No. 107136536, filed on Oct. 17, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure provides an ambient light sensor, and in particular to an ambient light sensor which can accurately sense a light intensity of an ambient light source in a short time.

BACKGROUND OF THE DISCLOSURE

More and more sensors are used by consumer electronics, such as mobile phones, to save energy and improve human-machine interaction. For example, the latest mobile phone uses ten or more sensors. Therefore, engineers are eager to integrate sensors so as to save energy, space and cost.

The ambient light sensor is used to detect variation of an ambient light source so as to regulate brightness of a screen of the mobile phone. When the ambient light dims, the screen of the mobile phone also dims to prevent light of the screen from dazzling a user. When the ambient light brightens, backlight of the screen also brightens to enhance visibility of articles presented on the screen. Therefore, the ambient light sensor can save energy and increase a running time of the mobile phone. The proximity sensor is a non-contact object-detection sensor. In the mobile phones, the proximity sensor is used to disable a touch control function when the user is talking close to the phones. As soon as the user's head approaches an earpiece, the touch control function is automatically turned off lest the touch screen operates erroneously by touching the user's face. As both the ambient light sensor and the proximity sensor are optical systems, they are normally encapsulated in an identical package structure so as to share the space, materials, wiring and power source.

SUMMARY OF THE DISCLOSURE

In response to the above-referenced technical inadequacies, the present disclosure provides an ambient light sensor for an electronic device including a capacitance adjuster circuit includes a first photoelectric component, a variable capacitor, an operational amplifier, a comparator, a pulse generator circuit and a pulse accumulator circuit. The first photoelectric component has a first positive terminal grounded and a first negative terminal. The first photoelectric component is configured to convert light energy passing through the first photoelectric component into a photocurrent. The variable capacitor is connected to the capacitance adjuster circuit and configured to receive the photocurrent. A capacitance of the variable capacitor is adjusted according to the photocurrent by the capacitance adjuster circuit. The operational amplifier has a first amplifier input terminal connected to the first negative terminal of the first photoelectric component, and a second amplifier input terminal connected to a reference voltage source. The variable capacitor is connected between the first amplifier input terminal and an output terminal of the operational amplifier. The operational amplifier is configured to output an amplified error signal based on a difference between a voltage at the first amplifier input terminal and a voltage of the reference voltage source and a gain of the operational amplifier. The comparator has a first comparator input terminal connected to the output terminal of the operational amplifier and a second comparator input terminal connected to the reference voltage source. The comparator is configured to compare the amplified error signal with the voltage of the reference voltage source to output a comparison signal. The pulse generator circuit is connected to an output terminal of the comparator. When the pulse generator circuit determines that a voltage at the first comparator input terminal of the comparator is larger than the voltage of the reference voltage source according to the comparison signal, the pulse generator circuit outputs a pulse signal, the pulse signal has a rising edge or a falling edge that is aligned with an instant time point at which the voltage at the first comparator input terminal is increased to a voltage that is larger than or equal to the voltage of the reference voltage source from a voltage that is smaller than the voltage of the reference voltage source. The pulse accumulator circuit is connected to the pulse generator circuit and the output terminal of the comparator. The pulse accumulator circuit is configured to accumulate the number of counts that the voltage at the first comparator input terminal is increased to the voltage that is larger than the voltage of the reference voltage source from the voltage that is smaller than the voltage of the reference voltage source according to the comparison signal.

As described above, in comparison with a conventional electronic device including only a small number of optoelectronic components, it takes a relatively long sensing time when a light intensity of an ambient light source is low. In order to reduce the sensing time, a large number of photoelectric components are required to be disposed in an improved conventional ambient light sensor. Those photoelectric components occupy a considerable space of an integrated circuit in an electronic device, so that a size of the electronic device cannot be reduced. Therefore, the present disclosure provides the ambient light sensor, in which the variable capacitor and the pulse generator are additionally configured for the other circuit components of the ambient light sensor. As a result, the ambient light sensor can accurately sense the light intensity of the ambient light source in a short time, under the condition that only the small number of (two) photoelectric components are disposed in the ambient light sensor to save circuit component configuration costs and reduce an occupied space. Accordingly, the electronic device can adjust a display screen to have a more desirable brightness according to a sensing result of the ambient light sensor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
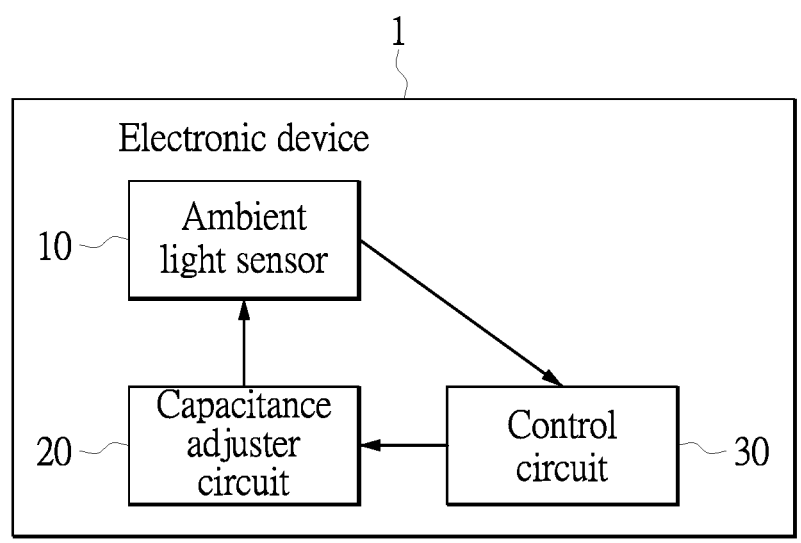
FIG. 1 is a block diagram of internal components of an electronic device to which an ambient light sensor is applied according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of internal components of an electronic device to which an ambient light sensor is applied according to a first embodiment of the present disclosure. As shown in FIG. 1, in the embodiment, the ambient light sensor 10 may be applied for an electronic device 1 such as a mobile device. The ambient light sensor 10 is disposed at a position corresponding to a display screen of the electronic device 1. The ambient light sensor 10 is configured to sense a light intensity of an ambient light source illuminating on the display screen of the electronic device 1, such as an ambient light intensity in an indoor environment or an outdoor environment. It should be noted that a control circuit 30 of the electronic device 1 may instruct a capacitance adjuster circuit 20 to adjust a sensing time and accuracy of the ambient light sensor 10. The control circuit 30 of the electronic device 1 may adjust brightness of the display screen of the electronic device 1 according to a sensing result of the ambient light sensor 10.

Figure 2:
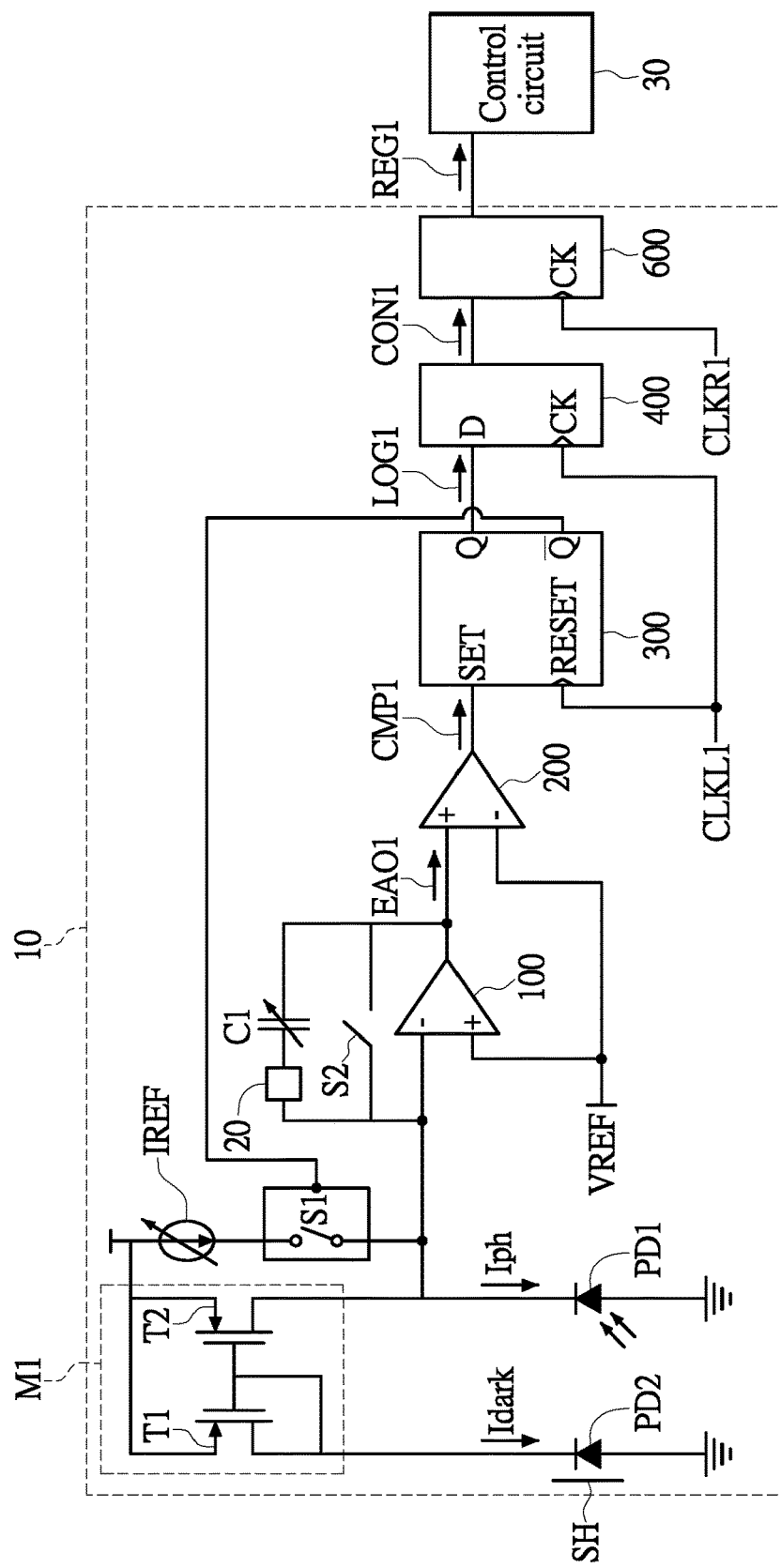
FIG. 2 is a circuit layout diagram of the ambient light sensor applied for the electronic device according to the first embodiment of the present disclosure.

Reference is further made to FIG. 2, which is a circuit layout diagram of the ambient light sensor applied for the electronic device according to the first embodiment of the present disclosure. As shown in FIG. 2, in the embodiment, the ambient light sensor 10 is applied for the capacitance adjuster circuit 20 and the control circuit 30 of the electronic device 1. The ambient light sensor 10 includes an operational amplifier 100, a comparator 200, a logic circuit 300, a counter circuit 400, a storage circuit 600, photoelectric components PD1 and PD2, a variable capacitor C1, a current mirror circuit M1 and switch components S1 and S2.

Figure 4:
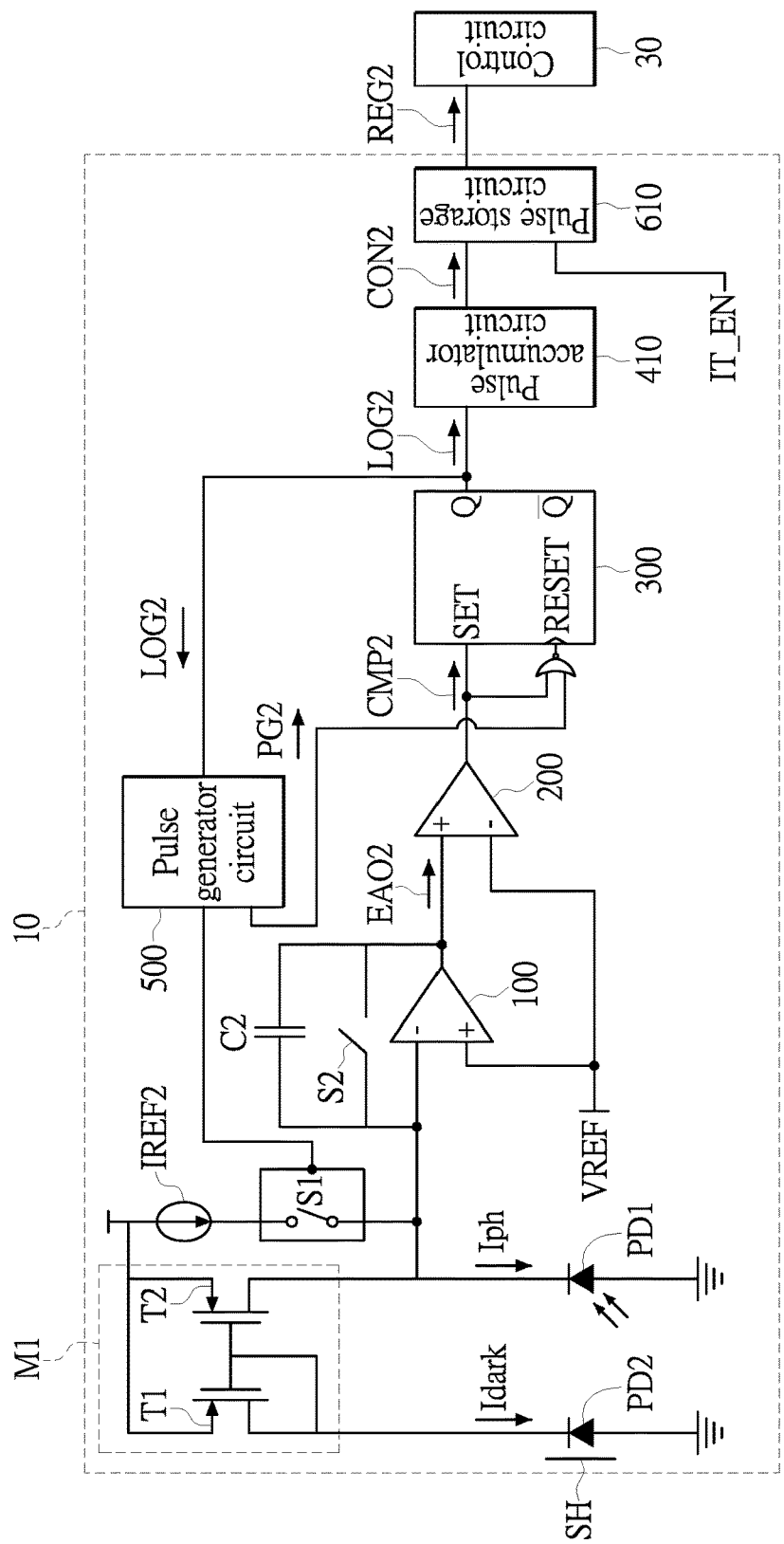
FIG. 4 is a circuit layout diagram of an ambient light sensor applied for an electronic device according to a second embodiment of the present disclosure.

The photoelectric components PD1 and PD2 are connected in parallel with each other. An inverting input terminal of the operational amplifier 100 is connected to negative terminals of the photoelectric components PD1 and PD2. Positive terminals of the photoelectric components PD1 and PD2 are grounded. A non-inverting input terminal of the operational amplifier 100 is connected to a reference voltage source VREF. The switch component S2 is connected in parallel to the variable capacitor C1. The variable capacitor C1 and the switch component S2 are connected between an output terminal of the operational amplifier 100 and the inverting input terminal of the operational amplifier 100. A first terminal of the switch component S1 is connected to a variable current source IREF. The variable current source IREF may supply a variable current, in practice, the current source IREF may be replaced with a constant current source IREF2 as shown in FIG. 4, but the present disclosure is not limited thereto. A second terminal of the switch component S1 is connected to the switch component S2, and a control terminal of the switch component S1 is connected to an output terminal $\overline{Q}$ of the logic circuit 300.

The variable capacitor C1 may be wirelessly or wiredly connected to the capacitance adjuster circuit 20 of the electronic device 1. The capacitance adjuster circuit 20 is configured to adjust a capacitance of the variable capacitor C1. For example, in the embodiment, the variable capacitor C1 is connected in series to the capacitance adjuster circuit 20. Alternatively, the variable capacitor C1 may be directly controlled by a human hand, which adjusts the capacitance of the variable capacitor C1.

The current mirror circuit M1 may be disposed optionally. An input terminal of the current mirror circuit M1 may be connected to a voltage source or a current source. Two output terminals of the current mirror circuit M1 are connected to negative terminals of the photoelectric components PD1 and PD2 respectively. For example, the current mirror circuit M1 includes PMOS transistors T1 and T2. Source terminals of the transistors T1 and T2 are connected to the voltage source or the current source. A gate terminal of the transistor T1 is connected to a gate terminal of the transistor T2 and a drain terminal of the transistor T1. The drain terminal of the transistor T1 is connected to the negative terminal of the photoelectric component PD2. The drain terminal of the transistor T2 is connected to the negative terminal of the photoelectric component PD1.

A non-inverting input terminal of the comparator 200 is connected to the output terminal of the operational amplifier 100, and an inverting input terminal of the comparator 200 is connected to the reference voltage source VREF. An output terminal of the comparator 200 is connected to a set terminal SET of the logic circuit 300. A reset terminal RESET of the logic circuit 300 may be connected to an additional clock circuit to obtain a clock signal CLKL1 from the additional clock circuit. In the embodiment, the logic circuit 300 is an SR flip-flop and the counter circuit 400 is a D flip-flop, but the present disclosure is not limited thereto, they may be replaced with other logic components according to actual requirements.

An output terminal Q of the logic circuit 300 is connected to an input terminal D of the counter circuit 400. A clock terminal CK of the counter circuit 400 may be connected to the additional clock circuit to obtain the clock signal CLKL1. An output terminal of the counter circuit 400 is connected to the storage circuit 600. For example, the storage circuit 600 may be a register or other circuit components having storing functions. An output terminal of the storage circuit 600 may be connected to a serial interface such as an I2C interface of the electronic device 1, and connected to the control circuit 30 through the serial interface.

Further, the control circuit 30 may be contacted with the negative terminals of the photoelectric components PD1 and PD2 or connected to the negative terminals of the photoelectric components PD1 and PD2. The control circuit 30 detects a photocurrent Iph generated by the photoelectric component PD1 and a dark current Idark generated by the photoelectric component PD2. Alternatively, the capacitance adjuster circuit 20 detects the photocurrent Iph generated by the photoelectric component PD1 and the dark current Idark generated by the photoelectric component PD2.

It is worth noting that a conventional ambient light sensor needs to include a large number of, for example, 64 photoelectric detectors disposed therein for quickly sensing an ambient light source having a low light intensity. Furthermore, when the photoelectric sensors are not irradiated by the ambient light source, the photoelectric sensors generate dark currents (also known as leakage currents). Therefore, additional light-shielding photoelectric detectors must be disposed in the conventional electronic device for cancelling the dark current. The number of the light-shielding photoelectric detectors is the same as the photoelectric detectors used for sensing the ambient light source such as 64 photoelectric detectors. Accordingly, a large number of, for example, a total number of 128 photoelectric sensors are required to be disposed in the conventional electronic device to sense a correct light intensity. That is, one set of the photoelectric sensors illuminated by the ambient light source generates the photocurrent, and another set of the photoelectric sensors that is not illuminated by the ambient light source generates the dark current. The dark current is subtracted from the photocurrent to obtain an actual current corresponding to the ambient light intensity. Therefore, if the conventional electronic device intends to accurately adjust the brightness of the display screen according to the actual current in the environment of the low light intensity, a large number of the photoelectric sensors need to be disposed and occupy an integrated circuit space in the electronic device, such that a size of the electronic device cannot be reduced.

In contrast, in the embodiment, only one photoelectric component PD1 is configured to generate the photocurrent Iph when the ambient light source illuminates light on the photoelectric component PD1, and only one light-shielding photoelectric component PD2 is disposed for the photoelectric component PD1 and configured to generate the dark current. As shown in FIG. 2, when the ambient light source such as a sun or an electric light illuminates light on the photoelectric component PD1, the photoelectric component PD1 converts light energy supplied from the ambient light source into the photocurrent Iph. The photocurrent Iph is proportional to the light intensity. The variable capacitor C1 is charged by the photocurrent Iph.

It should be understood that, in the case where a capacitance value of the variable capacitor C1 is constant, the lower the light intensity of the ambient light source is, the smaller the photocurrent Iph is. As a result, the operational amplifier charges the variable capacitor C1 for a longer time. That is, it takes the longer time to increase a voltage at the non-inverting input terminal of the comparator to a voltage that is larger than the voltage of the reference voltage source VREF received by the inverting input terminal of the comparator. Conversely, the higher the light intensity of the ambient light source is, the shorter the charging time of the variable capacitor C1 is.

The electronic device 1 may adjust the capacitance of the variable capacitance C1 of the ambient light sensor 10, such that the ambient light sensor 10 irradiated by the ambient light source having the low light intensity has a good sensing efficiency and even has the same sensing time for different photocurrents Iph. More specifically, the electronic device 1 obtains a value of the photocurrent Iph to be supplied to the variable capacitance C1, which may be detected by a current detector of the capacitance adjuster circuit 20 connected in series to the variable capacitance C1, or detected by a current detector inside the control circuit 30 or other additional current detectors in practice.

The capacitance adjuster circuit 20 of the electronic device 1 determines an adjustment range of the capacitance of the variable capacitor C1 according to the value of the sensed photocurrent Iph. When the photocurrent Iph is smaller than a photocurrent threshold stored in the capacitance adjuster circuit 20, the capacitance adjuster circuit 20 and other control circuit components may reduce the capacitance of the variable capacitor C1 and reduce a current supplied by the variable current source IREF to reduce a time during which a voltage of the variable capacitor C1 is charged to a target voltage value from a zero value by the smaller photocurrent Iph.

Conversely, when the photocurrent Iph is larger than the photocurrent threshold stored in the capacitance adjuster circuit 20, the capacitance adjuster circuit 20 may not adjust or increase the capacitance of the variable capacitor C1 and the current of the variable current source IREF. In this case, a time during which the voltage of the variable capacitor C1 is charged from the zero value to the target voltage value by the larger photocurrent Iph is the same as the time during which the voltage of the variable capacitor C1 is charged from the zero value to the target voltage value by the smaller photocurrent Iph, and the time is smaller than a time threshold.

The operational amplifier 100 calculates a voltage difference between an input voltage at the inverting input terminal of the operational amplifier 100 and the voltage of the reference voltage source VREF received by the non-inverting input of the operational amplifier 100. The operational amplifier 100 amplifies the voltage difference by a gain of the operational amplifier 100 to generate a product value, and outputs an amplified error signal EAO1 according to the product value.

When the non-inverting input terminal of the comparator 200 receives the amplified error signal EAO1, the comparator 200 compares a voltage difference between a voltage of the amplified error signal EAO1 with the voltage of the reference voltage source VREF received by the inverting input terminal of the comparator 200 to output a comparison signal CMP1. For example, when the voltage of the amplified error signal EAO1 is larger than the voltage of the reference voltage source VREF, the comparator 200 outputs the comparison signal CMP1 representing a high logic "1". Conversely, when the voltage of the amplified error signal EAO1 is smaller than the voltage of the reference voltage source VREF, the comparator 200 outputs the comparison signal CMP1 representing a low logic "0".

When the set terminal SET of the logic circuit 300 receives the comparison signal CMP1 reaching a reference level such as a logic level "1" from the comparator 200, the logic circuit 300 outputs a logic signal LOG1 representing the high logic "1" to the counter circuit 400.

When the counter circuit 400 receives the logic signal LOG1 representing the high logic, the counter circuit 400 calculates the number of counts CON1 that a voltage at the non-inverting terminal of the comparison 200 is increased to a voltage that is larger than the voltage of the reference voltage source VREF from a voltage that is smaller than the voltage of the reference voltage source, based on the comparison signal CMP1. The counter circuit 400 may output the number of counts CON1 to the storage circuit 600. The storage circuit 600 stores the number of counts CON1.

The storage circuit 600 may output a storing signal REG1 to the control circuit 30 of the electronic device 1 according to the number of counts CON1. The control circuit 30 of the electronic device 1 may determine the light intensity of the current ambient light source to adjust the brightness of the display screen of the electronic device 1, according to the storing signal REG1 from the storage circuit 600 and the adjustment range of the capacitance of the variable capacitor C1 from the capacitance adjuster circuit 20.

The electronic device 1 needs to more precisely adjust the brightness of the display screen. Therefore, the photoelectric component PD2 is disposed in the ambient light sensor 10 and connected in parallel to the photoelectric component PD1. The negative terminals of the photoelectric components PD1 and PD2 are connected to the inverting input terminal of the operational amplifier1 100, and the positive terminals of the photoelectric components PD1 and PD2 are grounded. A light-shielding component SH may be configured to shield the second photoelectric component PD2 to block light from passing through the second photoelectric component PD2.

A detector in the control circuit 30 of the electronic device 1 may detect the photocurrent Iph generated by the photoelectric component PD1 of the ambient light sensor 10 being illuminated by the ambient light source, and the dark current Idark generated by the photoelectric component PD2 that is not illuminated by any ambient light source. In the embodiment, the photoelectric components PD1 and PD2 have the same characteristics. The photocurrent Iph generated by the photoelectric component PD1 is a sum of the PD1's dark current and an actual current converted from the ambient light energy. Accordingly, the control circuit 30 of the electronic device 1 subtracts the PD1's dark current from the photocurrent Iph to obtain the actual current. In this way, the brightness of the display screen of the electronic device 1 can be adjusted more accurately according to the actual current converted from the ambient light source.

Further, when the output terminal Q of the logic circuit 300 outputs a logic "1" representing that an counting operation is being performed, the output terminal $\overline{Q}$ of the logic circuit 300 outputs a logic "0" to the switch component S1 to turn on the switch component S1. Conversely, when the output terminal Q of the logic circuit 300 outputs a logic "0" and the output terminal $\overline{Q}$ of the logic circuit 300 outputs a logic "1", the switch component S1 is turned off, and the counter circuit 400 does not perform the counting operation. During this period of time, the photocurrent Iph discharges the variable capacitor C1. The operational amplifier 100 regulates the inverting input terminal to the non-inverting input terminal such that a voltage EAO1 is gradually increased to a target value from an initial voltage to perform the sensing operation. In other words, the operational amplifier 100 charges the variable capacitor C1. When sensing operation finishes, the output terminal $\overline{Q}$ of the logic circuit 300 outputs the logic "0" to the switch component S1 to turn on the switch component S1, the variable current source IREF may supply a current to flow through the switch components S1 and S2 such that the photocurrent Iph generated by the photoelectric component PD1 and other currents flow through the switch component S2 but not the variable capacitor C1 to reset the variable capacitor C1 for next sensing operation.

Figure 3:
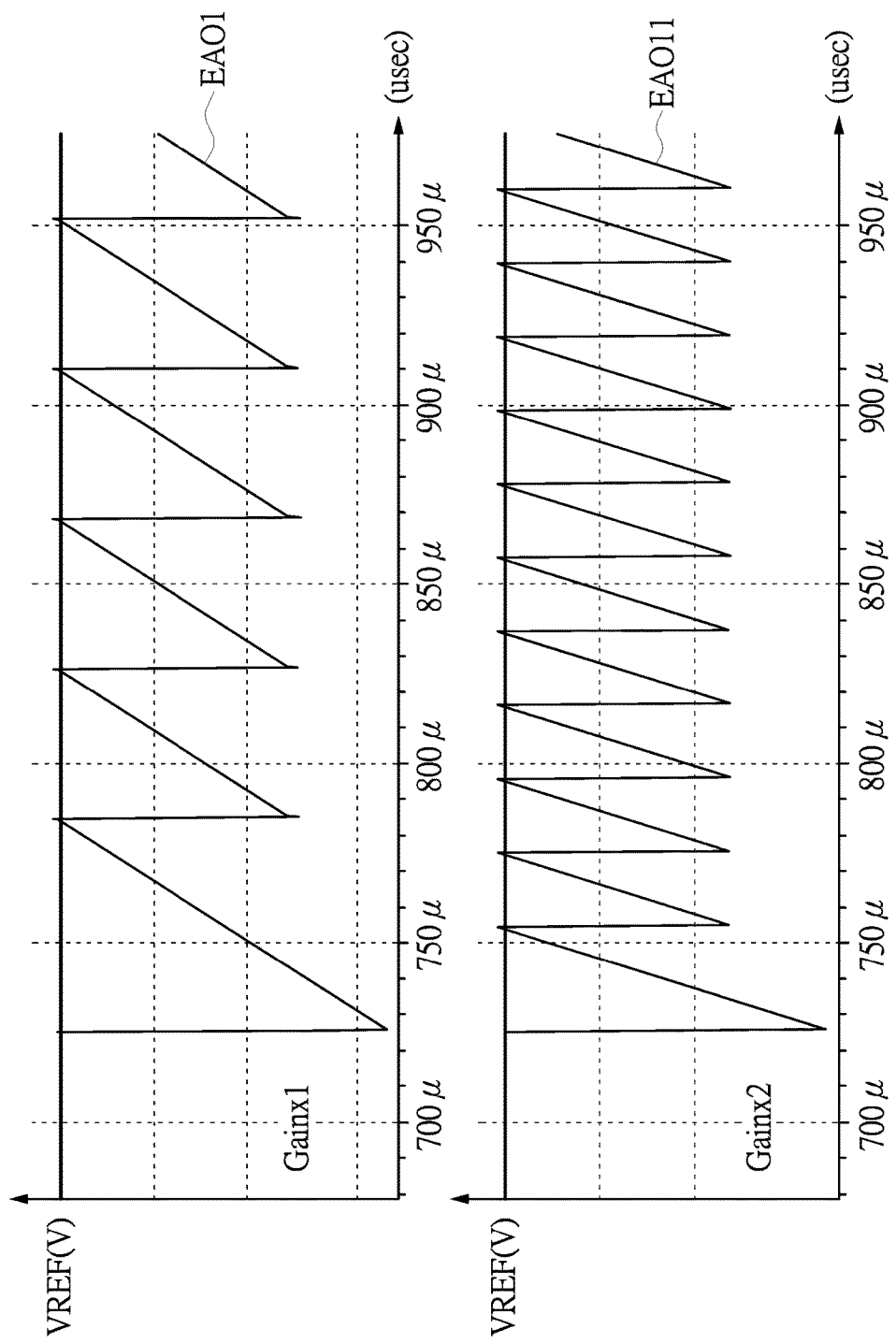
FIG. 3 is a waveform diagram of an amplified error signal outputted by an operational amplifier and a reference voltage signal received by the operational amplifier of the ambient light sensor according to the first embodiment of the present invention.

Reference is further made to FIG. 3, which is a waveform diagram of an amplified error signal outputted by an operational amplifier and a reference voltage signal received by the operational amplifier of the ambient light sensor according to the first embodiment of the present invention.

An upper waveform shown in FIG. 3 represents the amplified error signal EAO1, which is outputted by the operational amplifier 100 when a sense gain Gain is equal to 1. A lower waveform shown in FIG. 3 represents an amplified error signal EAO11, which is outputted by the operational amplifier 100 when the sense gain Gain is equal to 2. As shown in FIG. 3, the amplified error signal EAO11 is twice the amplified error signal EAO1 in sense ability. It means that the number of which the amplified error signal EAO11 higher than VREF is twice that of the amplified error signal EAO1. That is, the number of counts that the amplified error signal EAO11 are accumulated (corresponding to charge and discharge speed of the capacitor C1) is twice that of the amplified error signal EAO1. In other words, the sense gain Gain depends on the adjusted capacitance of the capacitor C1 and the adjusted current provided by the variable current source IREF.

The capacitance of the capacitor C1 is adjusted according to the photocurrent Iph such that each of the amplified error signals EAO1 and EAO11 outputted by the operational amplifier 100 has substantially the same amplitude, except for a initially adjusted first waveform of each of the amplified error signals EAO1 and EAO11, and a period of each sensing time is smaller than a time threshold.

Reference is made to FIG. 4, which is a circuit layout diagram of an ambient light sensor applied for an electronic device according to a second embodiment of the present disclosure. As shown in FIG. 4, in the embodiment, the ambient light sensor 10 includes the operational amplifier 100, the comparator 200, the logic circuit 300, a pulse accumulator circuit 410, the pulse generator circuit 500, a pulse storage circuit 610, the photoelectric components PD1 and PD2, a constant capacitor C2, the current mirror circuit M1 and the switch components S1 and S2.

Differences between the first embodiment and the second embodiment are described below. First, the capacitor C1 of the first embodiment is the variable capacitor, but the capacitor C2 of the second embodiment is the constant capacitor or a called non-variable capacitor. In practice, the constant capacitor C2 of the second embodiment may be replaced with a variable capacitor. In the second embodiment, the pulse generator circuit 500 is disposed in the ambient light sensor 10, and connected to the control terminal of the switch component S1, the output terminal of the logic circuit 300, and the input terminal of the pulse accumulator circuit 410. In the first embodiment, the logic circuit 300 is connected to an additional clock generator circuit for generating the clock signal CLKL1 for triggering the logic circuit 300. In contrast, in the second embodiment, the set terminal SET of the logic circuit 300 is connected to the output terminal of the comparator 200, and the reset terminal RESET of the logic circuit 300 is connected to the output terminal of the comparator 200 through an NOR gate.

The constant capacitor C2 is discharged by the photocurrent Iph from the photoelectric component PD1, and is charged by the operational amplifier 100. A charging time is inversely proportional to the light intensity of the ambient light source. The operational amplifier 100 outputs the amplified error signal EAO2 according to the gain multiplied by the voltage difference between the input voltage at the inverting input terminal of the operational amplifier 100 and the voltage of the reference voltage source VREF.

When the comparator 200 determines that a voltage of the amplified error signal EAO2 is larger than the voltage of the reference voltage source VREF, the comparator 200 outputs a comparison signal CMP2 representing a logic "1" to the set terminal SET of the logic circuit 300 and one input terminal of the NOR gate. When the set terminal SET of the logic circuit 300 receives the comparison signal CMP2 representing the logic "1", the logic circuit 300 outputs a logic signal LOG2 representing the logic "1" through the output terminal Q thereof to an input terminal of the pulse accumulator circuit 410. The pulse accumulator circuit 410 accumulates to generate the number of counts CON2 to be stored in the pulse storage circuit 610 or update the number of original counts CON2 stored in the pulse storage circuit 610.

It should be noted that, when the logic circuit 300 outputs the logic signal LOG2 to the pulse accumulator circuit 410, the logic circuit 300 outputs the logic signal LOG2 to the pulse generator circuit 500 to reset the logic circuit 300 after the pulse accumulator circuit 410 completes the accumulation. More specifically, when the comparison signal CMP2 received by the one input terminal of the NOR gate from the comparator 200 represents a logic"0", and a pulse signal PG2 received by another input terminal of the NOR gate from the pulse generator circuit 500 represents the logic"0", the NOR gate generates a signal representing a logic"1" to the reset terminal RESET of the logic circuit 300 to reset the logic circuit 300.

The above comparison signal CMP2 has a rising edge or a falling edge that is aligned with an instant time point, at which the voltage of the amplified error signal EAO2 is increased to a voltage that is larger than or equal to the voltage of the reference voltage source VREF from a voltage that is smaller than the voltage of the reference voltage source VREF. The pulse accumulator circuit 410 accumulates the number of counts CON2 that an input voltage at the non-inverting terminal of the comparator 200 is increased to a voltage that is larger than the voltage of the reference voltage source VREF from a voltage that is smaller than the voltage of the reference voltage source VREF, at the instant time point of the amplified error signal EAO2, according to the comparison signal CMP2.

That is, when the voltage of the amplified error signal EAO2 is increased to the voltage that is larger than the voltage of the reference voltage source VREF from the voltage that is smaller than the voltage of the reference voltage source VREF, the pulse accumulator circuit 410 accumulates. In this way, the number of counts CON2 accumulated by the pulse accumulator circuit 410 is correct without missing. Therefore, the control circuit 30 of the electronic device can accurately adjust the brightness of the display screen of the electronic device according to the number of correct counts CON2 accumulated by the pulse accumulator circuit 410.

On the other hand, the pulse generator circuit 500 may control the operation of the switch component S1 according to the logic value of the logic signal LOG2, the number of counts and a counting time of the logic circuit 300. When the pulse generator circuit 500 outputs a pulse signal at a low level for turning on the switch component S1, a current supplied from the constant current source IREF2 flows to other circuit components such as the capacitor C2 as shown in FIG. 4 through the switch component S1.

Figure 5:
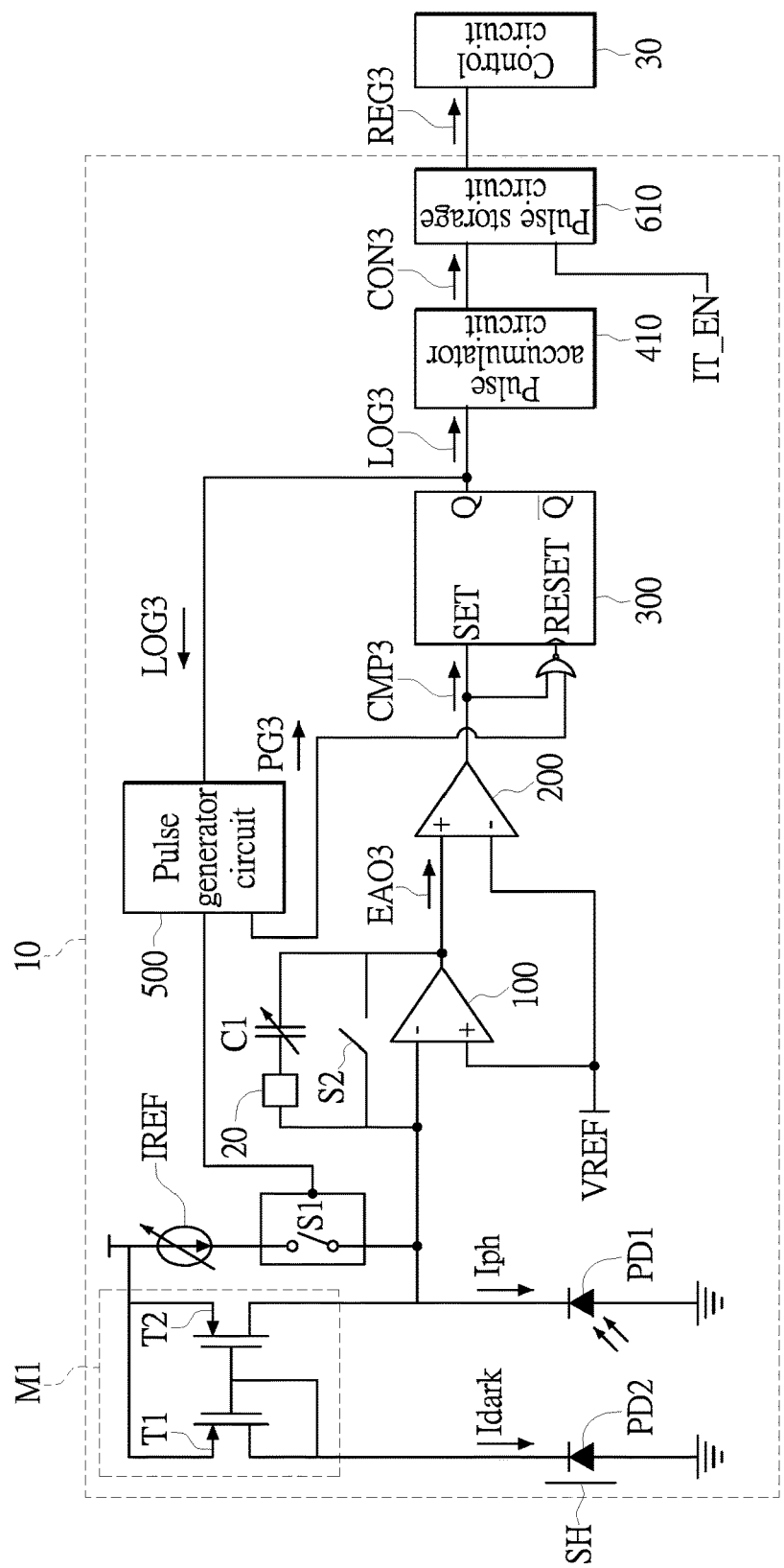
FIG. 5 is a circuit layout diagram of an ambient light sensor applied for an electronic device according to a third embodiment of the present disclosure.

Reference is made to FIG. 5, which is a circuit layout diagram of an ambient light sensor applied for an electronic device according to a third embodiment of the present disclosure. As shown in FIG. 5, in the embodiment, the ambient light sensor 10 includes the operational amplifier 100, the comparator 200, the logic circuit 300, the pulse accumulator circuit 410, the pulse generator circuit 500, the pulse storage circuit 610, the photoelectric components PD1 and PD2, the variable capacitor C1, the current mirror circuit M1 and the switch components S1 and S2. In the third embodiment, the constant capacitor C2 as described in the second embodiment is replaced with the variable capacitor C1. In other words, in the third embodiment, the pulse generator circuit 500 is additionally disposed in the ambient light sensor as described in the first embodiment, with reference to the configurations of the second embodiment. Therefore, in the third embodiment, the electronic device 1 can instantly adjust the display screen to have a more desirable brightness as the light intensity of the ambient light source changes by the configuration of the variable capacitor C1 and the pulse generator circuit 500.

Figure 6:
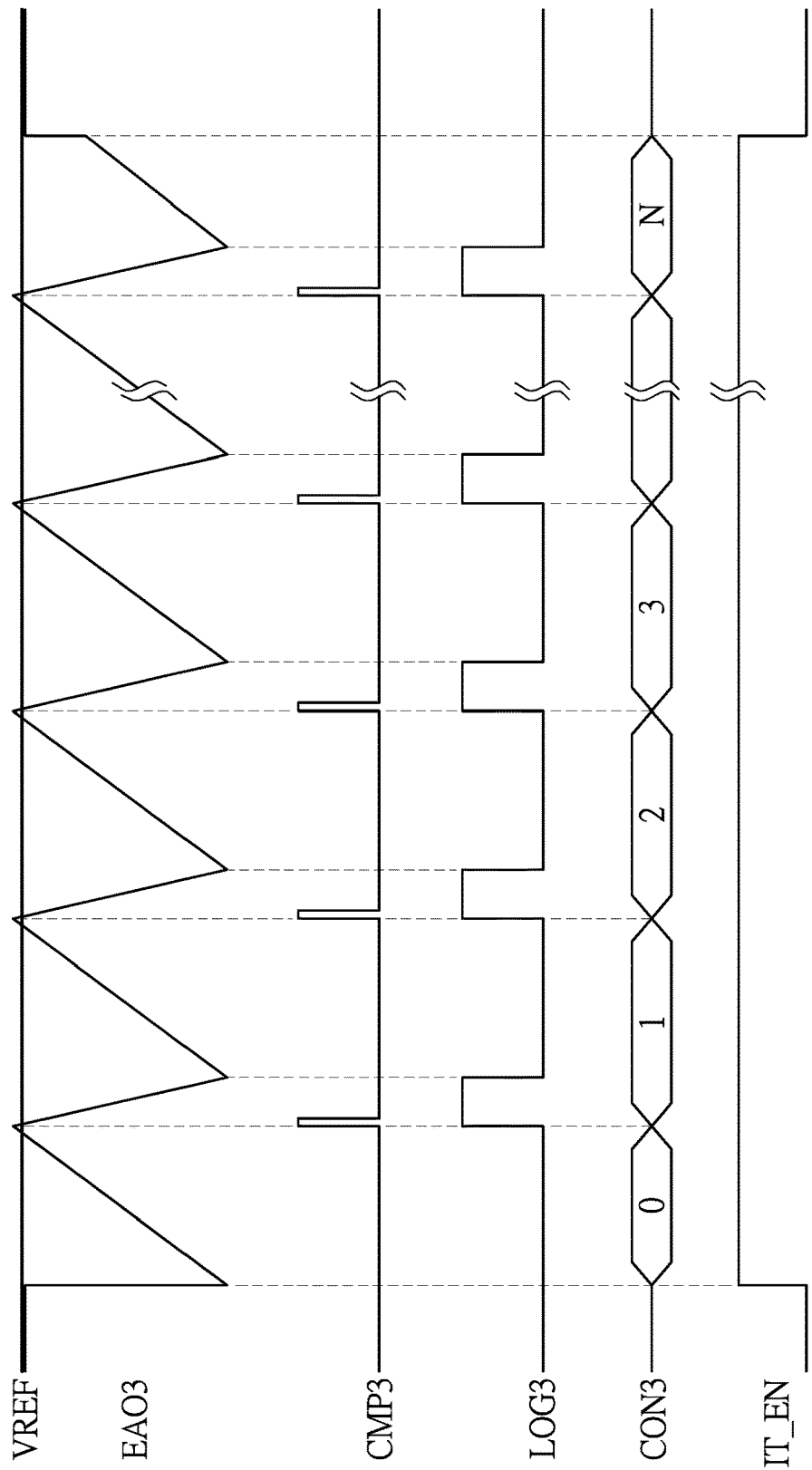
FIG. 6 is a waveform diagram of an amplified error signal outputted by an operational amplifier, a comparison signal outputted by a comparator, a logic signal outputted by a logic circuit, the number of counts accumulated by a pulse accumulator circuit and an enable signal inputted to a pulse storage circuit of the ambient light sensor according to the third embodiment of the present disclosure.

Reference is further made to FIG. 6, which is a waveform diagram of an amplified error signal outputted by an operational amplifier, a comparison signal outputted by a comparator, a logic signal outputted by a logic circuit, the number of counts accumulated by a pulse accumulator circuit and an enable signal inputted to a pulse storage circuit of the ambient light sensor according to the third embodiment of the present disclosure. As shown in FIG. 6 from top to bottom, waveforms belong to the reference voltage source VREF for the operational amplifier 100 and the comparator 200, an amplified error signal EAO3 outputted by the operational amplifier 100, a comparison signal CMP3 outputted by the comparator 200, a logic signal LOG3 outputted by the logic circuit 300, the number of counts CON3 outputted by the pulse accumulator circuit 410, and an enable signal IT_EN inputted to the pulse storage circuit 610 respectively.

When the voltage of the amplified error signal EAO3 is increased to a voltage that is larger than the voltage of the reference voltage source VREF, the comparator 200 outputs the comparison signal CMP3 representing a high level to the set terminal SET of the logic circuit 300. As shown in FIG. 6, an instant time point at which a voltage of each of the amplified error signal EAO3 is increased to a voltage that is equal to the voltage of the reference voltage source VREF from a voltage that is smaller than the voltage of the reference voltage source VREF is aligned with a rising edge at which the low logic "0" is risen to the high logic "1" of each of the comparison signal CMP3.

When the set terminal SET of the logic circuit 300 receives the comparison signal CMP3 at the high logic "1", the logic circuit 300 outputs the logic signal LOG3 at the high logic "1" to the pulse accumulator circuit 410. The pulse accumulator circuit 410 accumulates the number of counts CON3 that the voltage at the non-inverting terminal of the comparator 200 is increased to a voltage that is larger than the voltage of the reference voltage VREF from a voltage that is smaller than the voltage of the reference voltage VREF. That is, the pulse accumulator circuit 410 accumulates the number of the comparison signal CMP3.

A rising edge of the amplified error signal EAO3 gradually rises with the photocurrent Iph discharged to the capacitor C1. When the voltage of the capacitor C1 is increased to a voltage that is larger than the voltage of the reference voltage VREF, a falling edge of the amplified error signal EAO3 gradually falls as a current supplies to the capacitor C1 from the variable current source IREF. A pulse of the logic signal LOG3 is generated with each time of the charge and discharge operations. The pulse accumulator circuit 410 accumulates the number of the pulse, i.e. the number of counts that the capacitor C1 performs the charge and discharge operations, over a period of time.

The circuit components of the ambient light sensor transmit signals very quickly, such that when the voltage of each of the amplified error signal EAO3 is increased to a voltage that is equal to the voltage of the reference voltage VREF from a voltage that is smaller than the voltage of the reference voltage VREF, the pulse accumulator circuit 410 performs an accumulation operation.

In addition, the logic circuit 300 may output the logic signal LOG3 at the high level to the pulse generator circuit 500. The pulse generator circuit 500 then outputs a pulse signal PG3 corresponding to the logic signal LOG3 to the NOR gate connected to the reset terminal RESET of the logic circuit 300. For example, the pulse signal PG3 has the same pulse width as that of the logic signal LOG3. The capacitor C1 is discharged by the operational amplifier 100 during a time period corresponding to the pulse width of the amplified error signal EAO3 falling. After the time period corresponding to the pulse width ends, the pulse signal PG3 at the low level falling from the high level is outputted from the pulse generator circuit 500 to the NOR gate, and meanwhile, the comparison signal CMP3 at the low level is outputted from the comparator 200 to the NOR gate, such that the logic circuit 300 is reset. After resetting, the logic circuit 300 outputs the logic signal LOG3 at the low level.

As described above, the capacitor C1 is discharged by the operational amplifier 100 during the time period corresponding to the pulse width of the amplified error signal EAO3 falling. Then, the time period corresponding to the pulse width ends, the photocurrent Iph gradually discharges to the capacitor C1 such that the voltage of the capacitor C1 is gradually increased. A voltage of a next amplified error signal EAO3 as shown in FIG. 6 is increased to a voltage that is larger than the voltage of the reference voltage VREF, the above operation is performed again.

Figure 7:
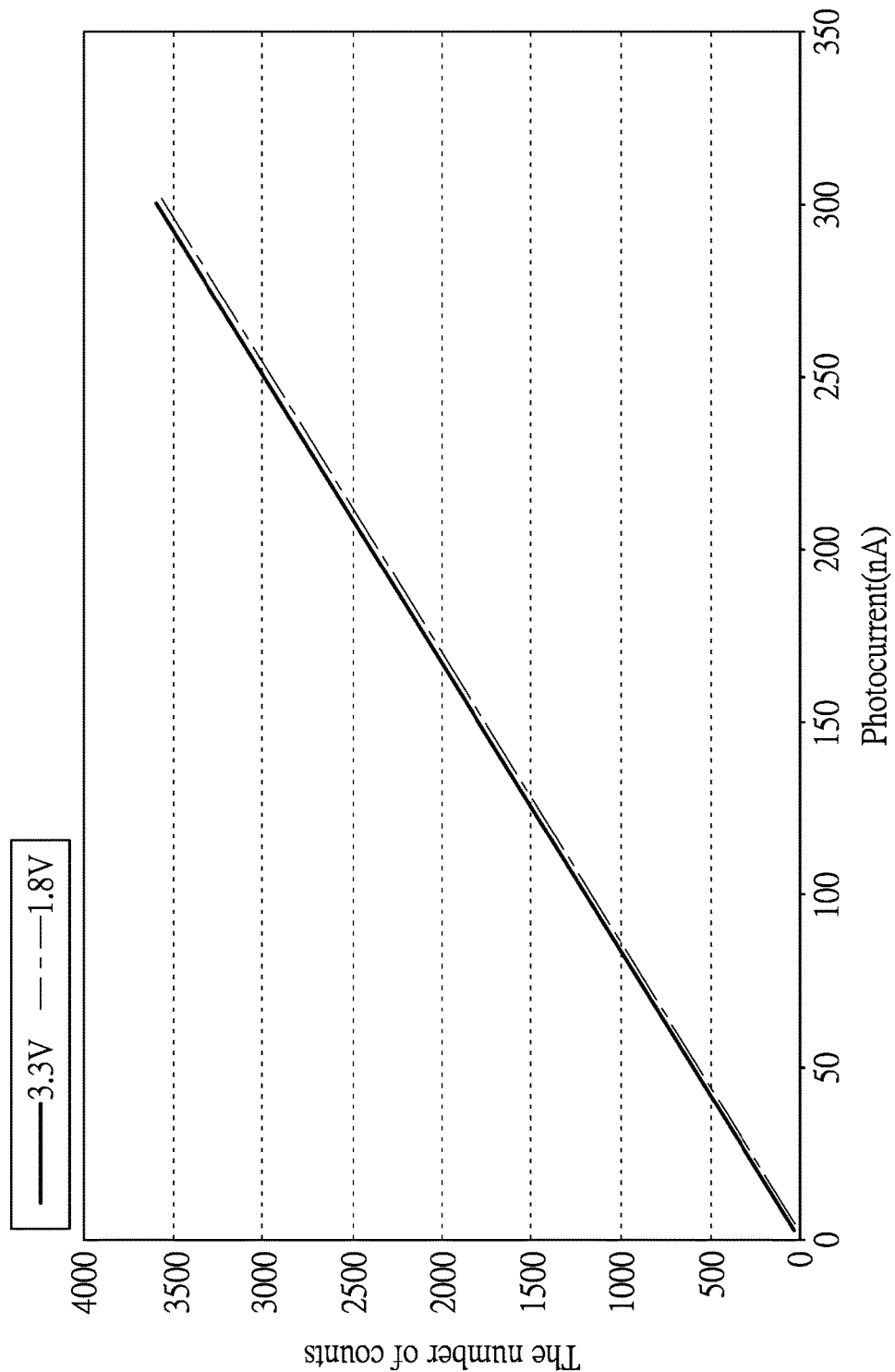
FIG. 7 is a curve diagram of a photocurrent of a photoelectric component versus the number of counts accumulated by the pulse accumulator circuit of the ambient light sensor according to the third embodiment of the present disclosure.
Figure 8:
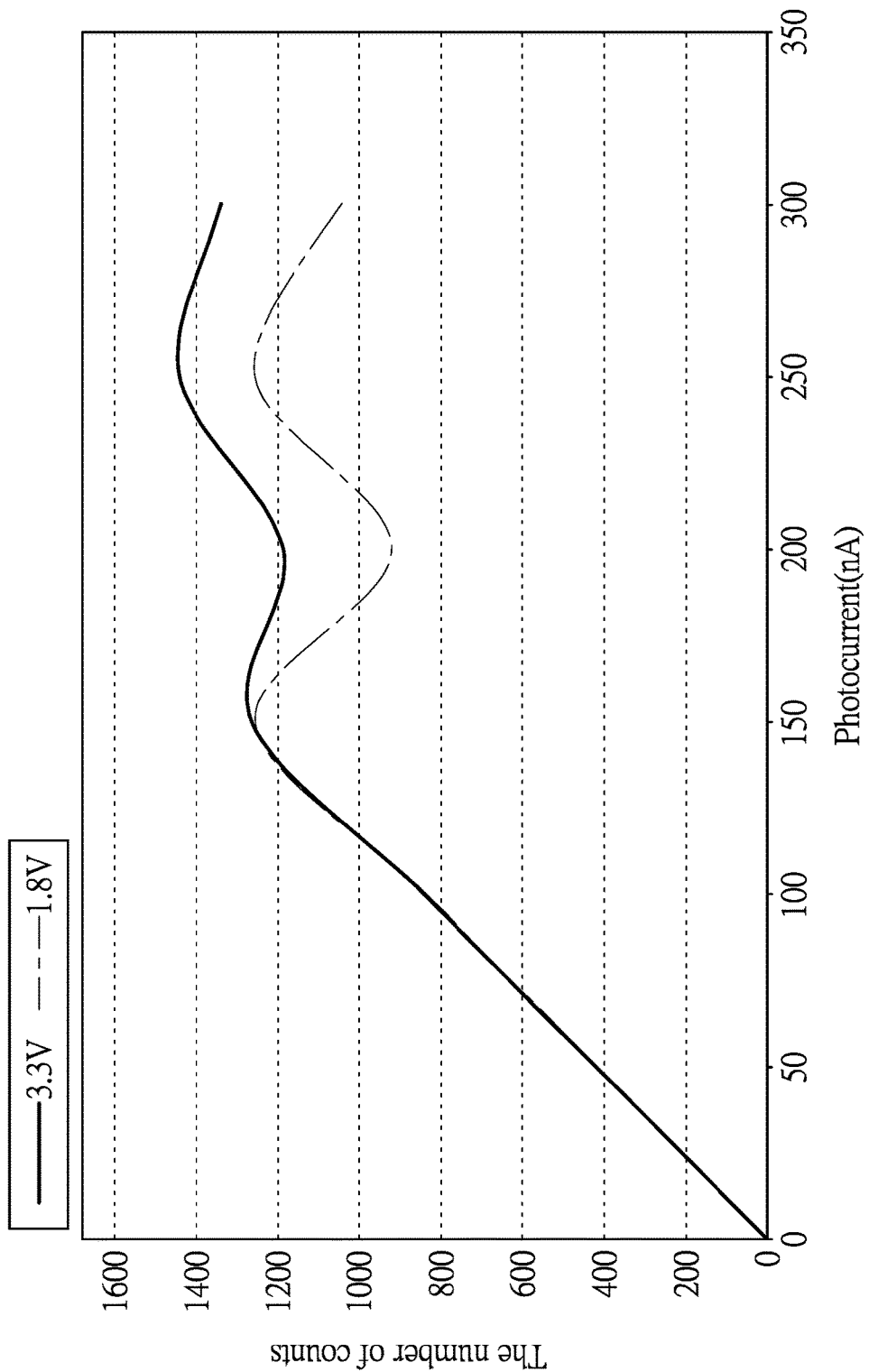
FIG. 8 is a curve diagram of a photocurrent of a photoelectric component versus the number of counts counted by a circuit of a conventional ambient light sensor.

Reference is further made to FIGS. 7 and 8, FIG. 7 is a curve diagram of a photocurrent of a photoelectric component versus the number of counts accumulated by the pulse accumulator circuit of the ambient light sensor according to the third embodiment of the present disclosure; FIG. 8 is a curve diagram of a photocurrent of a photoelectric component versus the number of counts counted by a circuit of a conventional ambient light sensor. As shown in FIGS. 7 and 8, a horizontal axis represents current values of the photocurrents, and the vertical axis represents the number of counts accumulated and counted by the pulse accumulator circuit and the conventional counter circuit separately.

Obviously, a curve of the conventional ambient light sensor as shown in FIG. 8 is irregular. It means that the conventional ambient light sensor generates a clock signal having constant pulses. As a result, an instant time point at which a voltage of each of an amplified error signal is increased to a voltage that is equal to a voltage of a reference voltage source from a voltage that is smaller than the voltage of the reference voltage source may not be aligned with a rising edge of a pulse signal. In contrast, as shown in FIG. 6, the instant time point of the amplified error signal EAO3 at which the voltage of the amplified error signal EAO3 is increased to the voltage that is larger than or equal to the voltage of the reference voltage source VREF from the voltage that is smaller than the voltage of the reference voltage source VREF is aligned with the rising edges of the logic signal LOG3 and the comparison signal CMP3. Therefore, in the conventional ambient light sensor, a counter circuit may not be triggered to count such that the number of counts counted by the counter circuit may be lower than the number of actual times. As a result, a brightness of a display screen of a conventional electronic device cannot be adjusted precisely and a nonlinear curve of a photocurrent to the number of counts is exhibited.

In contrast, the linear curve of the ambient light sensor of the embodiment is shown in FIG. 7. It means that the pulse generator circuit 500 generates the pulse signal PG3 for triggering the pulse accumulator circuit 410 to accumulate the number of counts CON3 that the voltage at the non-inverting terminal of the comparator 200 is increased to the voltage that is larger than the voltage of the reference source VREF from the voltage that is smaller than the voltage of the reference source VREF at the instant time point. Therefore, in the embodiment, an accuracy of the brightness adjustment of the display screen of the electronic device can be effectively improved.

In summary, the present disclosure provides the ambient light sensor, in which the variable capacitor and the pulse generator are additionally configured for the other circuit components of the ambient light sensor. Therefore, the ambient light sensor can accurately sense the light intensity of the ambient light source in a short time, under the condition that only the small number of (two) photoelectric components are provided to save circuit component configuration costs and reduce an occupied space. Accordingly, the electronic device can adjust the display screen to have a more desirable brightness according to a sensing result of the ambient light sensor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An ambient light sensor for an electronic device including a capacitance adjuster circuit, comprising:
   a first photoelectric component having a first positive terminal grounded and a first negative terminal and configured to convert light energy passing through the first photoelectric component into a photocurrent;
   a variable capacitor connected to the capacitance adjuster circuit and configured to receive the photocurrent, wherein a capacitance of the variable capacitor is adjusted according to the photocurrent by the capacitance adjuster circuit;
   an operational amplifier having a first amplifier input terminal connected to the first negative terminal of the first photoelectric component, and a second amplifier input terminal connected to a reference voltage source, wherein the variable capacitor is connected between the first amplifier input terminal and an output terminal of the operational amplifier, and the operational amplifier is configured to output an amplified error signal based on a difference between a voltage at the first amplifier input terminal and a voltage of the reference voltage source and a gain of the operational amplifier;
   a comparator having a first comparator input terminal connected to the output terminal of the operational amplifier and a second comparator input terminal connected to the reference voltage source, and configured to compare the amplified error signal with the voltage of the reference voltage source to output a comparison signal;
   a pulse generator circuit connected to an output terminal of the comparator, wherein when the pulse generator circuit determines that a voltage at the first comparator input terminal of the comparator is larger than the voltage of the reference voltage source according to the comparison signal, the pulse generator circuit outputs a pulse signal, a pulse signal has a rising edge or a falling edge that is aligned with an instant time point at which the voltage at the first comparator input terminal is increased to a voltage that is larger than or equal to the voltage of the reference voltage source from a voltage that is smaller than the voltage of the reference voltage source; and
   a pulse accumulator circuit connected to the pulse generator circuit and the output terminal of the comparator, and configured to accumulate the number of counts that the voltage at the first comparator input terminal is increased to the voltage that is larger than the voltage of the reference voltage source from the voltage that is smaller than the voltage of the reference voltage source according to the comparison signal.

2. The ambient light sensor of claim 1, further comprising:
   a second photoelectric component connected in parallel to the first photoelectric component, having a second positive terminal grounded and a second negative terminal connected to the first amplifier input terminal of the operational amplifier, and configured to output a dark current; and
   a light-shielding component configured to shield the second photoelectric component to block light from passing through the second photoelectric component.

3. The ambient light sensor of claim 2, wherein the electronic device further includes a control circuit configured to obtain the photocurrent of the first photoelectric component and the dark current of the second photoelectric component, subtract the dark current from the photocurrent to obtain an ambient photocurrent, and determine a light intensity according to the ambient photocurrent.

4. The ambient light sensor of claim 2, further comprising:
   a current mirror circuit having an input terminal connected to a voltage source or a current source, and two output terminals connected to the first negative terminal of the first photoelectric component and the second negative terminal of the second photoelectric component respectively.

5. The ambient light sensor of claim 1, further comprising:
   a logic circuit connected between the comparator and the pulse accumulator circuit, and configured to receive the comparison signal from the comparator and convert the comparison signal into a logic signal to be outputted to the pulse accumulator circuit.

6. The ambient light sensor of claim 5, wherein the logic circuit is an SR flip-flop.

7. The ambient light sensor of claim 1, further comprising:
   a pulse storage circuit connected to the pulse accumulator circuit, and configured to receive and store the number of counts that the voltage at the first comparator input terminal is increased to the voltage that is larger than or equal to the voltage of the reference voltage source from the voltage that is smaller than the voltage of the reference voltage source, from the pulse accumulator circuit.

8. The ambient light sensor of claim 1, further comprising:
   a current source connected to one terminal of the variable capacitor that is connected to the first amplifier input terminal of the operational amplifier, configured to supply a current flowing through the variable capacitor, and including a variable current source, a constant current source or combination thereof, wherein the capacitance adjuster circuit is configured to adjust the capacitance of the variable capacitor according to the photocurrent.

9. The ambient light sensor of claim 8, further comprising:
   a first switch component having a first terminal connected to the current source, a second terminal connected to the first amplifier input terminal of the operational amplifier, and a control terminal connected to the pulse generator circuit.

10. The ambient light sensor of claim 1, further comprising: a second switch component connected between the output terminal of the operational amplifier and the first amplifier input terminal of the operational amplifier, and connected in parallel to the variable capacitor.

* * * * *